(12) United States Patent
Kou et al.

(10) Patent No.: US 12,382,280 B2
(45) Date of Patent: Aug. 5, 2025

(54) ADDRESS SETTING SYSTEM, ADDRESS SETTING METHOD, ADDRESS SETTING MANAGEMENT DEVICE AND PROGRAM

(71) Applicant: Nippon Telegraph and Telephone Corporation, Tokyo (JP)

(72) Inventors: Sei Kou, Musashino (JP); Tomoya Hatano, Musashino (JP); Tetsuya Suzuki, Musashino (JP); Yasutaka Kimura, Musashino (JP); Tomohiro Taniguchi, Musashino (JP); Shinya Tamaki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 414 days.

(21) Appl. No.: 18/008,568

(22) PCT Filed: Jun. 11, 2020

(86) PCT No.: PCT/JP2020/023059
§ 371 (c)(1),
(2) Date: Dec. 6, 2022

(87) PCT Pub. No.: WO2021/250860
PCT Pub. Date: Dec. 16, 2021

(65) Prior Publication Data
US 2023/0232215 A1    Jul. 20, 2023

(51) Int. Cl.
*H04W 8/26*    (2009.01)

(52) U.S. Cl.
CPC .................... *H04W 8/26* (2013.01)

(58) Field of Classification Search
None
See application file for complete search history.

(56) References Cited

U.S. PATENT DOCUMENTS

| 6,542,819 B1* | 4/2003 | Kovacs | G01S 5/019 701/408 |
|---|---|---|---|
| 9,420,561 B2* | 8/2016 | Li | H04W 24/02 |
| 2008/0008179 A1 | 1/2008 | Chen et al. | |
| 2016/0007198 A1* | 1/2016 | Lacey | H04L 63/126 713/175 |
| 2016/0036762 A1* | 2/2016 | Droms | H04L 41/12 709/224 |
| 2016/0271793 A1 | 9/2016 | Inaba et al. | |

(Continued)

FOREIGN PATENT DOCUMENTS

| JP | 2006020180 | 1/2006 |
|---|---|---|
| JP | 2012191263 | 10/2012 |

(Continued)

*Primary Examiner* — Lonnie V Sweet
(74) *Attorney, Agent, or Firm* — Fish & Richardson P.C.

(57) ABSTRACT

A location information transmitter transmits location information within a prescribed area. An IoT terminal receives the location information and transmits the location information and a device identifier. An address setting management device receives the location information and the device identifier and sets an IP address to be assigned to the IoT terminal on the basis of the location information and the device identifier and transmits the IP address to the IoT terminal. The IoT terminal sets the IP address received from the address setting management device for itself.

5 Claims, 4 Drawing Sheets

(56) References Cited

U.S. PATENT DOCUMENTS

| | | | |
|---|---|---|---|
| 2019/0124704 A1 | 4/2019 | Sun et al. | |
| 2019/0149623 A1* | 5/2019 | McPhee | H04L 67/52 709/223 |
| 2019/0271550 A1* | 9/2019 | Breed | G01C 21/3811 |
| 2019/0289002 A1* | 9/2019 | Vegh | H04L 63/0823 |
| 2019/0297102 A1* | 9/2019 | Davis, III | H04L 63/1416 |
| 2019/0356742 A1* | 11/2019 | Ali | H04L 67/143 |
| 2021/0044371 A1* | 2/2021 | Chen | H04J 13/0003 |

FOREIGN PATENT DOCUMENTS

| | | |
|---|---|---|
| JP | 2016172303 | 9/2016 |
| JP | 6194128 | 8/2017 |
| JP | 2019106682 | 6/2019 |
| JP | 2019518393 | 6/2019 |
| JP | 2019175120 | 10/2019 |
| KR | 20090036574 | 4/2009 |
| WO | WO 2017068122 | 4/2017 |

* cited by examiner

Fig. 3

| AREA A | AREA B |
|---|---|
| 192.168.1.10<br>192.168.1.11<br>192.168.1.12<br>.. | 192.168.2.10<br>192.168.2.11<br>192.168.2.12<br>.. |
| AREA C | AREA D |
| 192.168.3.10<br>192.168.3.11<br>192.168.3.12<br>.. | <u>192.168.4.10</u><br><u>192.168.4.11</u><br><u>192.168.4.12</u><br><u>..</u> |

ADDRESS SETTING SYSTEM, ADDRESS SETTING METHOD, ADDRESS SETTING MANAGEMENT DEVICE AND PROGRAM

CROSS-REFERENCE TO RELATED APPLICATIONS

This application is a National Stage application under 35 U.S.C. § 371 of International Application No. PCT/JP2020/023059, having an International Filing Date of Jun. 11, 2020, the disclosure of which is considered part of the disclosure of this application, and is incorporated by reference in its entirety into this application.

TECHNICAL FIELD

The present disclosure relates to an address setting system, an address setting method, an address setting management device, and a program.

BACKGROUND ART

As IoT terminals have become widespread, IP addresses have been assigned to many communication terminals. In order to manage a large number of terminals, it is necessary to set an IP address for each terminal according to its installation location (see for example PTL 1).

CITATION LIST

Patent Literature

[PTL 1] Japanese Patent No. 6194128

SUMMARY OF THE INVENTION

Technical Problem

In a conventional address management device, the identifier of a setting target terminal, location information thereof, and the association therebetween are registered in advance. Therefore, the terminal must be set for a fixed location. In addition, the settings cannot be changed automatically when the installation location of the terminal is changed. Therefore, it takes a lot of efforts to set an address when a new terminal is installed or when the installation location is changed.

The present disclosure is directed to a solution to the above-described problem, and it is an object of the disclosure to provide an address setting system, an address setting method, an address setting management device, and a program which allow an IP address to be automatically set for an IoT terminal according to an installation location thereof.

Means for Solving the Problem

An address setting system according to the disclosure includes a location information transmitter which transmits location information within a prescribed area, an IoT terminal which receives the location information and transmits the location information and a device identifier, and an address setting management device which receives the location information and the device identifier, sets an IP address to be assigned to the IoT terminal on the basis of the location information and the device identifier, and transmits the IP address to the IoT terminal, and the IoT terminal sets the IP address received from the address setting management device for itself.

Effects of the Invention

The present disclosure allows an IP address to be automatically set for an IoT terminal according to an installation location thereof.

BRIEF DESCRIPTION OF DRAWINGS

FIG. 3 illustrates IP addresses determined for the areas.

DESCRIPTION OF EMBODIMENTS

Figure 1:
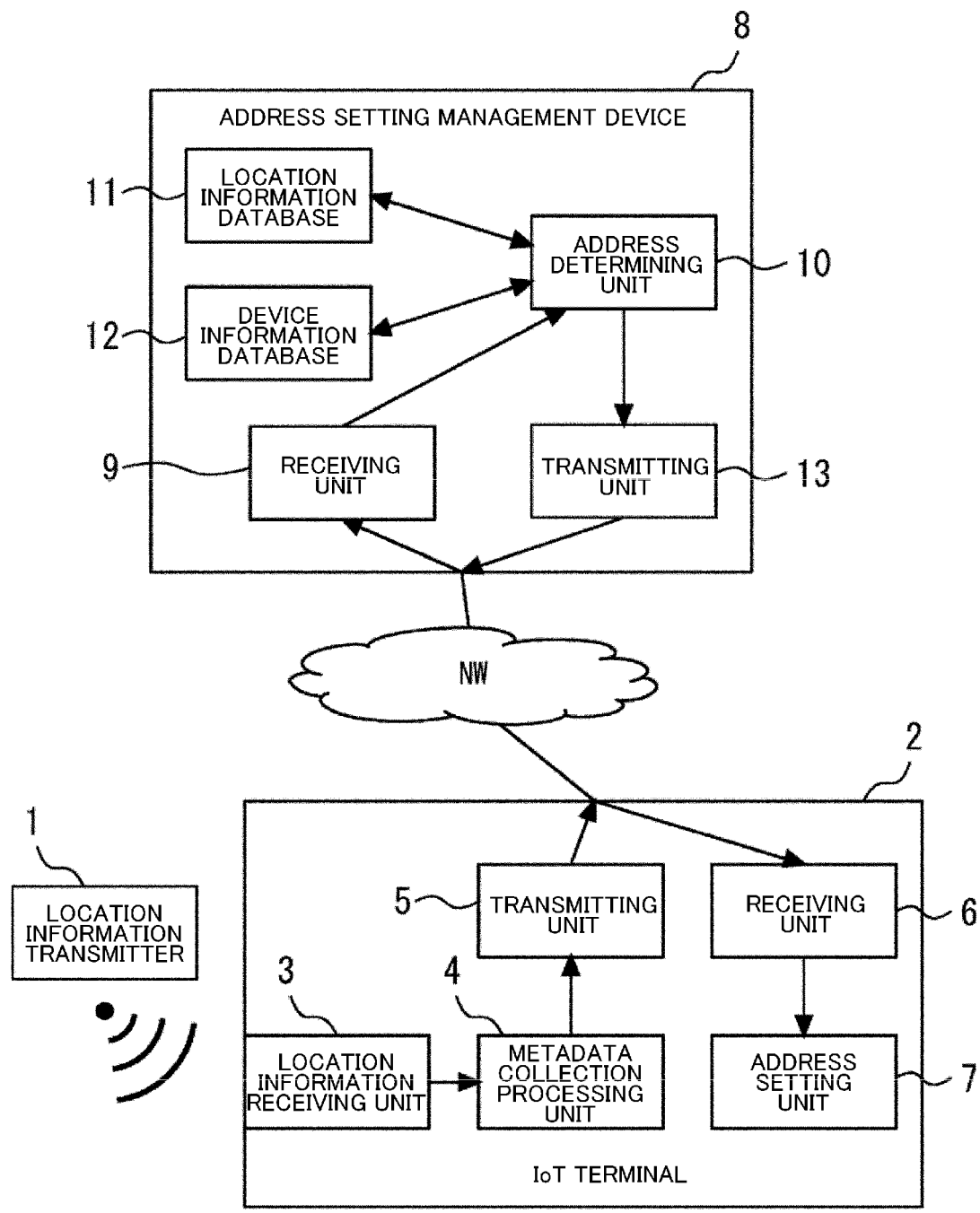
FIG. 1 is a block diagram of an address setting system according to an embodiment of the invention.

FIG. 1 is a block diagram of an address setting system according to an embodiment of the invention. A location information transmitter 1 is a device which transmits location information within a prescribed area using a wireless technique such as beacons, the GPS, and Wi-Fi.

An IoT terminal 2 has a location information receiving unit 3, a metadata collection processing unit 4, a transmitting unit 5, a receiving unit 6, and an address setting unit 7. The location information receiving unit 3 periodically receives location information from the location information transmitter 1. The metadata collection processing unit 4 collects and stores location information from the location information receiving unit 3.

The transmitting unit 5 transmits a message asking for an IP address together with location information obtained from the metadata collection processing unit 4 and a device identifier. The device identifier is an identifier assigned to each terminal such as a unique MAC address, a device model number, and a serial number.

A unique communication protocol or an existing protocol is used as a data transmitting method. When an existing protocol such as DHCP or LLDP is used, data desired to be transmitted can be embedded in the area of options by the existing protocol. For example, the transmitting unit 5 transmits the location information and the device identifier embedded in the options area of a DHCP packet.

An address setting management device 8 has a receiving unit 9, an address determining unit 10, a location information database 11, a device information database 12, and a transmitting unit 13. The receiving unit 9 receives a message asking for an IP address from the IoT terminal 2 over a wireless or wired network. The message includes location information and a device identifier.

The address determining unit 10 determines an IP address to be assigned to the IoT terminal 2 on the basis of the received location information and device identifier by referring to the location information database 11 and the device information database 12. The address determining unit 10 saves the device identifier and the assigned IP address as information. The address determining unit 10 newly assigns an IP address in response to different location information obtained from the receiving unit 6 even if an IP address has already been assigned to the target IoT terminal 2. The transmitting unit 13 transmits the determined IP address to the IoT terminal 2.

Figure 2:
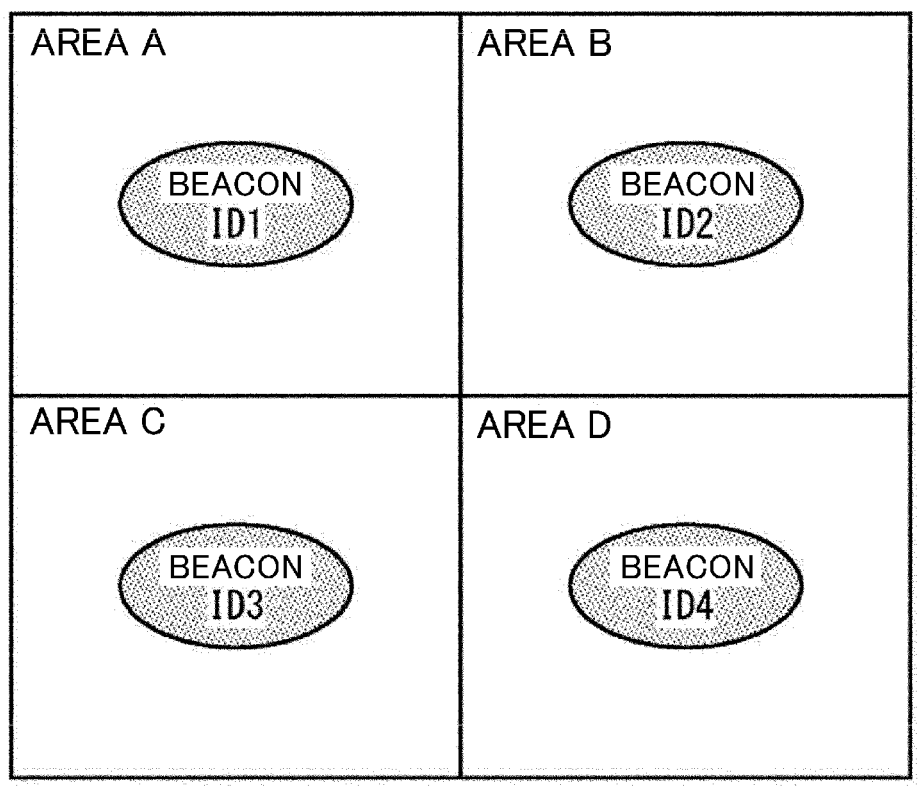
FIG. 2 is a diagram of areas to be managed by beacons.

The location information database 11 includes a collection of associations between location information and IP addresses. For example, when the location information transmitter 1 uses a beacon, the location information database 11 has information managed by one beacon per area. FIG. 2 illustrates the areas managed by beacons. The area where the IoT terminal 2 has been installed can be determined by the location information obtained from the receiving unit 9. In this case, a specific identifier such as a beacon ID is used. For example, when location information about a beacon ID1 is obtained, it is determined that the IoT terminal 2 is installed in the area A.

FIG. 3 illustrates IP addresses determined for the areas. The address determining unit 10 assigns an IP address determined for each area to the IoT terminal 2 in turn. After assigning the IP addresses, the address determining unit 10 saves the association between the device identifier and the IP address. This prevents the same IP address from being assigned again to any of other IoT terminals existing in the same area. This allows the beacon transmission range to be narrowed and one IP address to be assigned to one area.

The type of device such as a camera can be identified from the device identifier. The device information database 12 includes a collection of associations between device identifiers and IP addresses. The address determining unit 10 assigns an IP address according to the device identifier by referring to the device information database 12. For example, the address determining unit 10 determines the type of the IoT terminal 2 from the obtained device identifier and assigns an IP address accordingly.

The receiving unit 6 of the IoT terminal 2 receives the IP address from the address setting management device 8. The address setting unit 7 sets the received IP address from the address setting management device 8 for its own IoT terminal 2.

Now, operation in response to change in the installation location of the IoT terminal 2 will be described. When location information obtained from the location information receiving unit 3 is different from the stored location information by itself, the metadata collection processing unit 4 of the IoT terminal 2 sends the new location information and the device identifier to the transmitting unit 5 and gives an instruction to re-request an IP address. The transmitting unit 5 transmits a message to re-request an IP address. The address determining unit 10 obtains new location information and a device identifier from the receiving unit 9. When the obtained device identifier already exists, the address determining unit 10 unassigns the IP address assigned to this device identifier and refers to the location information database 11 to assign a new IP address corresponding to the obtained location information. The device identifier and the newly assigned IP address are saved as information. Then, the IoT terminal 2 sets the new IP address received from the address setting management device 8 for itself.

According to the embodiment, the address setting management device 8 sets an IP address to be assigned to the IoT terminal 2 on the basis of location information and a device identifier received from the IoT terminal 2 and transmits the IP address to the IoT terminal 2. This allows the IP address to be set automatically to the IoT terminal 2 according to its installation location. Therefore, it is not necessary to register the identifier of the setting target terminal, location information, and the association therebetween in advance, and the setting target terminal does not have to be installed in a fixed location. In addition, even when the installation location of the terminal is changed, the IP address of the terminal is automatically changed, which can greatly reduce the efforts necessary for address setting. This makes it easier to manage a large number of IoT terminals. For example, the address setting system can be applied to the use and management of many IoT terminals in buildings, in agriculture, or the like.

Figure 4:
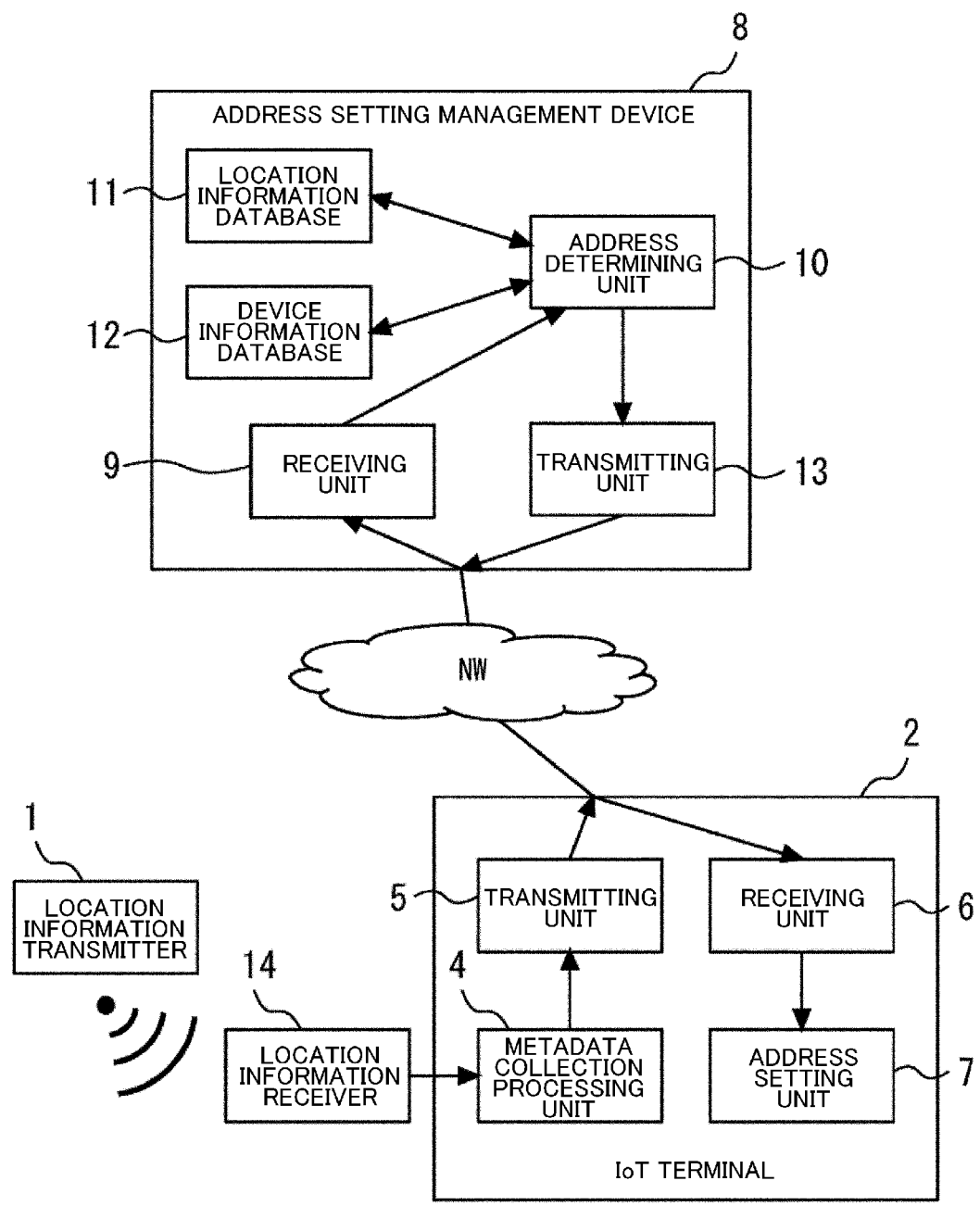
FIG. 4 is a block diagram of an address setting system according to a modification of the embodiment.

FIG. 4 is a block diagram of an address setting system according to a modification of the embodiment. Instead of the location information receiving unit 3, a location information receiver 14 is provided outside the IoT terminal 2 and connected to the metadata collection processing unit 4 of the IoT terminal 2. The location information receiver 14 periodically receives location information from the location information transmitter 1 and provides the information to the metadata collection processing unit 4 of the IoT terminal 2. In this case, the same functions as the above described embodiment can be provided.

At least a part of the address setting management device 8 according to the above-describe embodiment may be implemented by a computer. In this case, a program to realize the functions may be recorded on a computer-readable recording medium, and the program recorded on the recording medium may be read and executed by a computer system. The term "computer system" herein includes an OS and hardware such as peripheral devices. The term "computer-readable recording medium" refers to a portable medium such as a flexible disk, a magneto-optical disk, a ROM, and a CD-ROM, and any other storage device such as a hard disk built in the computer system. Furthermore, the "computer-readable recording medium" refers to a medium which dynamically retains a program for a short period of time such as a communication line when the program is transmitted over a network such as the Internet or a communication line such as a telephone line or a medium which retains a program for a prescribed time period such as a volatile memory inside a server or a computer system which serves as client in the case. The program may realize some of the above-described functions or may realize the above-described functions in combination with a program already recorded in the computer system or using a programmable logic device such as an FPGA (Field Programmable Gate Array).

REFERENCE SIGNS LIST

1 Location information transmitter
2 IoT terminal
8 Address setting management device
9 Receiving unit
10 Address determining unit
11 Location information database
12 Device information database
13 Transmitting unit

The invention claimed is:

1. An address setting system, comprising:
a location information transmitter configured to transmit location information within a prescribed area;
an Internet of Things (IoT) terminal configured to receive the location information and transmit the location information and a device identifier; and
an address setting management device configured to receive the location information and the device identifier, determine an Internet Protocol (IP) address to be assigned to the IoT terminal on a basis of the location information and the device identifier, and transmit the IP address to the IoT terminal,
wherein:
the address setting management device comprises:

a receiver configured to receive location information and a device identifier from the IoT terminal:
a location information database including a collection of associations between location information and IP addresses;
a device information database including a collection of associations between device identifiers and IP addresses:
a processor configured to determine the IP address to be assigned to the IoT terminal on the basis of the received location information and device identifier by referring to the location information database and the device information database; and
a transmitter configured to transmit the IP address to the IoT terminal; and
the IoT terminal is configured to set the IP address received from the address setting management device for itself.

2. The address setting system according to claim 1, wherein
the processor is configured to newly assign an IP address upon obtaining different location information from the receiver if an IP address has already been assigned to the device identifier.

3. The address setting system according to claim 1, further comprising a location information receiver provided outside the IoT terminal and connected to the IoT terminal to periodically receive the location information from the location information transmitter.

4. An address setting method comprising:
transmitting location information within a prescribed area by a location information transmitter;
receiving the location information and transmitting the location information and a device identifier by an Internet of Things (IoT) terminal;
receiving the location information and the device identifier, setting an Internet Protocol (IP) address to be assigned to the IoT terminal on a basis of the location information and the device identifier, and transmitting the IP address to the IoT terminal by an address setting management device;
determining the IP address to be assigned to the IoT terminal on the basis of the received location information and device identifier by referring to a location information database and a device information database, wherein:
the location information database includes a collection of associations between location information and IP addresses; and
the device information database includes a collection of associations between device identifiers and IP addresses;
transmitting the IP address to the IoT terminal; and
setting the IP address received from the address setting management device by the IoT terminal for itself.

5. An address setting management device, comprising:
a receiver configured to receive location information and a device identifier from an Internet of Things (IoT) terminal;
a processor configured to set an Internet Protocol (IP) address to be assigned to the IoT terminal on a basis of the received location information and device identifier by referring to a location information database and a device information database, wherein:
the location information database includes a collection of associations between location information and IP addresses;
the device information database includes a collection of associations between device identifiers and IP addresses; and
a transmitter configured to transmit the set IP address to the IoT terminal.

* * * * *